(12) United States Patent
Tung

(10) Patent No.: US 9,127,701 B2
(45) Date of Patent: Sep. 8, 2015

(54) FASTENING DEVICE

(71) Applicant: Marine Town Inc., New Taipei (TW)

(72) Inventor: Chin-Chung Tung, New Taipei (TW)

(73) Assignee: MARINE TOWN INC., New Taipei (TW)

( * ) Notice: Subject to any disclaimer, the term of this patent is extended or adjusted under 35 U.S.C. 154(b) by 181 days.

(21) Appl. No.: 13/906,578

(22) Filed: May 31, 2013

(65) Prior Publication Data

US 2014/0356063 A1  Dec. 4, 2014

(51) Int. Cl.
*F16B 2/06* (2006.01)
*F16B 5/06* (2006.01)

(52) U.S. Cl.
CPC .............. *F16B 2/065* (2013.01); *F16B 5/0664* (2013.01); *Y10T 403/7069* (2015.01)

(58) Field of Classification Search
CPC . F16B 2/065; F16B 2/0664; Y10T 403/7069; Y10T 403/7056; Y10T 403/76; Y10T 403/7058
USPC .............. 403/267, 321, 361, 370, 373, 374.1, 403/374.2, 374.3, 374.4, 408.1, 403/DIG. 9–DIG. 11, DIG. 14; 292/80, 81, 292/87, 300, 303, DIG. 53, DIG. 54
See application file for complete search history.

(56) References Cited

U.S. PATENT DOCUMENTS

| | | | | |
|---|---|---|---|---|
| 3,656,503 A * | 4/1972 | Ward | ............................ | 137/359 |
| 4,006,498 A * | 2/1977 | Cuschera | ......................... | 4/693 |
| 4,085,650 A * | 4/1978 | Flynn | ............................ | 411/403 |
| 4,174,911 A * | 11/1979 | Maccario et al. | ............. | 403/303 |
| 4,726,705 A * | 2/1988 | Gomes | ......................... | 403/292 |
| 4,810,145 A * | 3/1989 | Villas | ............................ | 411/206 |
| 5,139,361 A * | 8/1992 | Camuffo | .................... | 403/408.1 |
| 5,342,139 A * | 8/1994 | Hoffman | ....................... | 403/327 |
| 5,580,204 A * | 12/1996 | Hultman | ....................... | 411/509 |
| 5,647,684 A * | 7/1997 | Chen | ............................ | 403/370 |
| 5,669,731 A * | 9/1997 | Hironaka et al. | ............. | 403/397 |
| 5,738,462 A * | 4/1998 | Petersen et al. | .............. | 403/353 |
| 6,237,970 B1 * | 5/2001 | Joannou | ........................ | 292/241 |
| 6,374,772 B1 * | 4/2002 | Brandt | ......................... | 119/57.8 |
| 6,789,826 B1 * | 9/2004 | Helgenberg et al. | ...... | 292/341.15 |
| 7,152,849 B2 * | 12/2006 | Graber | ............................ | 256/22 |
| 7,275,289 B2 * | 10/2007 | Lipniarski | ....................... | 24/297 |
| 8,162,559 B2 * | 4/2012 | Krige | ............................ | 403/259 |
| 2004/0109725 A1 * | 6/2004 | Hein et al. | .................. | 403/374.3 |
| 2004/0165947 A1 * | 8/2004 | Herb | ............................ | 403/374.3 |
| 2006/0056911 A1 * | 3/2006 | Noro et al. | .................. | 403/408.1 |
| 2010/0308605 A1 * | 12/2010 | Fiedler | ........................ | 292/251.5 |
| 2012/0048174 A1 * | 3/2012 | Miller et al. | .................. | 114/362 |
| 2012/0237316 A1 * | 9/2012 | Chiu | ............................ | 411/353 |

* cited by examiner

*Primary Examiner* — Daniel P Stodola
*Assistant Examiner* — Jonathan Masinick
(74) *Attorney, Agent, or Firm* — WPAT, P.C.; Anthony King

(57) ABSTRACT

A fastening device includes a resilient clamping member and a holder cup respectively stopped at opposing inner wall and outer wall of a support structure, a rubber female connector accommodated in the holder cup, a fastening member adjustably inserted through the rubber female connector, the holder cup and the resilient clamping member to control the relatively clamping position between the resilient clamping member and the holder cup, and a male connector fastened to a decorative ornamental panel and detachably fastenable to the rubber female connector.

11 Claims, 12 Drawing Sheets

FASTENING DEVICE

BACKGROUND OF THE INVENTION

1. Field of the Invention

The present invention relates to decorative ornamental panel mounting technology and more particularly, to a fastening device for fastening a decorative ornamental panel in a wall rapidly and firmly.

2. Description of the Related Art

In addition to the requirements of the fashion aesthetic, upholstery also emphasizes practical function. In order to achieve the layout of imagery patterns, decoration materials must be firmly mounted. For example, male and female connection members are commonly used to affix seat cushions, wall decorative ornamental panels, or ceiling plates. However, according to conventional designs, male and female connection members are used with screws to affix decorative ornamental panels to the object to be decorated by the decorative ornamental panels. However, if one mounting screw hole is not in perfect alignment, it is necessary to drill a new hole for mounting, complicating the installation operation.

Further, because regular male and female connection members are commonly made of plastics, the engagement force between a male connection member and a mating female connection member is low. Further, during a dismounting operation, detaching a male connection member may cause the mating female connection member to be pulled out of place, resulting in component damage. Further, after having been frequently mounted and dismounted, the tolerance between the male connection member and the mating female connection member will be expanded due to overfriction, affecting further matching stability and strength.

Further, in some cases, the decorative ornamental panel must match the mounting wall perfectly without any clearance, preventing shaking and vibration loosening. However, conventional designs do not allow relative adjustment to eliminate clearance between the decorative ornamental panel and the mounting wall, therefore, conventional designs cannot meet the actual requirements.

SUMMARY OF THE INVENTION

The present invention has been accomplished under the circumstances in view. It is the main object of the present invention to provide a fastening device, which enables a decorative ornamental panel to be quickly and firmly secured to a support structure by means of a male connector at the decorative ornamental panel and a mating rubber female connector at the support structure. It is another object of the present invention to provide a fastening device, which is practical for seat cushion, indoor upholstery, marine upholstery as well as door catch applications.

To achieve these and other objects of the present invention, a fastening device comprises a resilient clamping member and a holder cup respectively stopped at opposing inner wall and outer wall of a support structure, a rubber female connector accommodated in the holder cup, a fastening member adjustably inserted through the rubber female connector, the holder cup and the resilient clamping member to control the relatively clamping position between the resilient clamping member and the holder cup, and a male connector fastened to a decorative ornamental panel and detachably fastenable to the rubber female connector for enabling the decorative ornamental panel to be quickly and firmly secured to the support structure.

The fastening device further comprises a supplementary cushion member. The supplementary cushion member comprises a flat annular base, and a protruding portion extended from the flat annular base. The supplementary cushion member is optionally set between the male connector and the decorative ornamental panel to change the elevation of the male connector at the decorative ornamental panel subject to different application requirements.

Thus, the fastening device of the present invention facilitates mounting and dismounting for a wide range of applications. Because the fastening device is highly detachable, it facilitates maintenance work and has significant industrial value.

Other advantages and features of the present invention will be fully understood by reference to the following specification in conjunction with the accompanying drawings, in which like reference signs denote like components of structure.

DETAILED DESCRIPTION OF THE INVENTION

Figure 1:
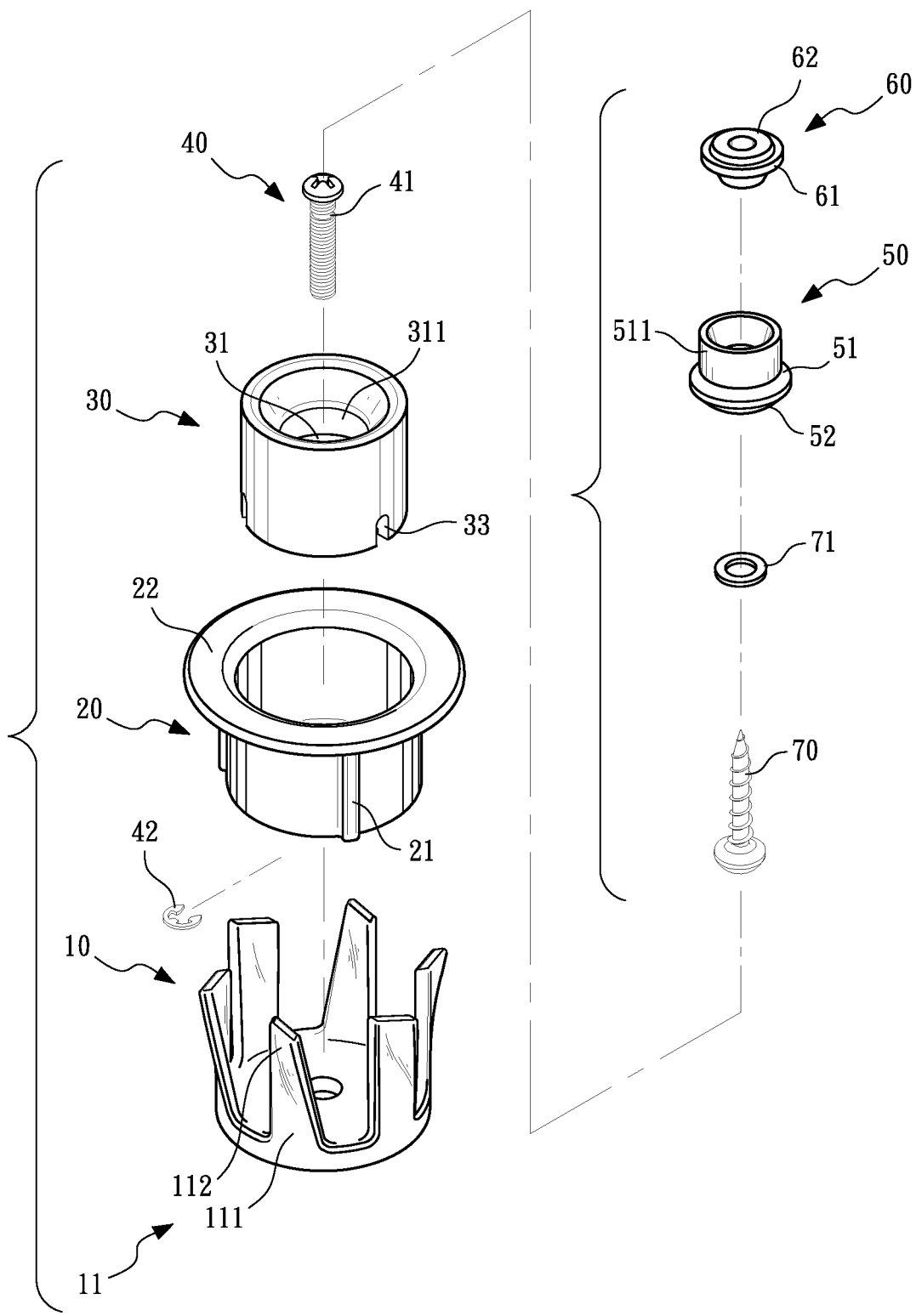
FIG. 1 is an exploded view of a fastening device in accordance with the present invention.
Figure 2:
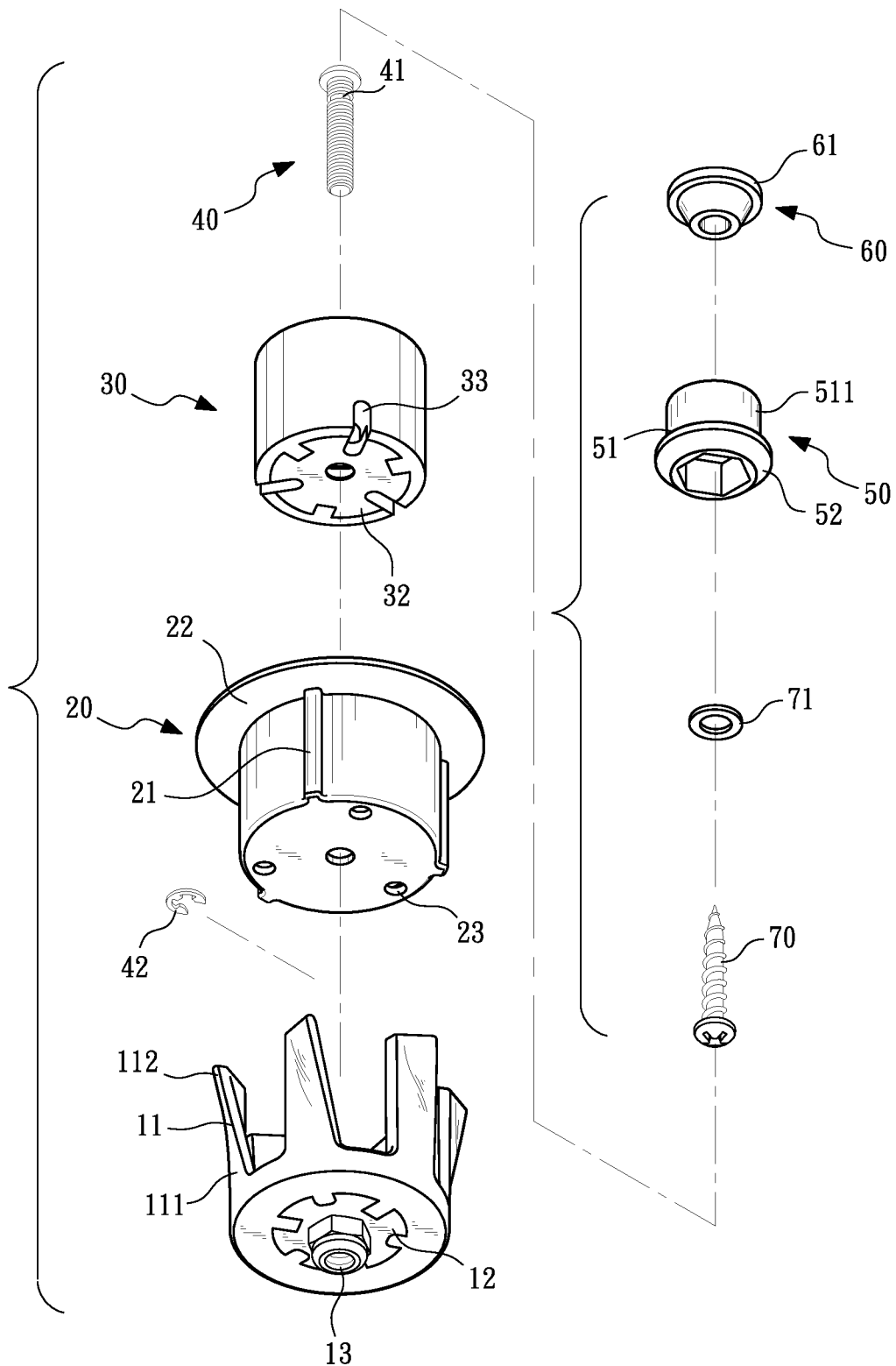
FIG. 2 corresponds to FIG. 1 when viewed from another angle.

Referring to FIGS. 1-5, a fastening device in accordance with the present invention is shown. The fastening device comprises a resilient clamping member 10, a holder cup 20, a rubber female connector 30, a fastening member 40, and a male connector 50.

The resilient clamping member 10 is a plastic member comprising a plurality of equiangularly spaced clamping pawls 11. Each clamping pawl 11 defines a fixed end 111 and an opposing free end 112. The cross sectional area of the free end 112 is smaller than the cross-sectional area of the fixed end 111. Further, the free end 111 is gradually outwardly deflected in direction away from the fixed end 112.

Figure 3:
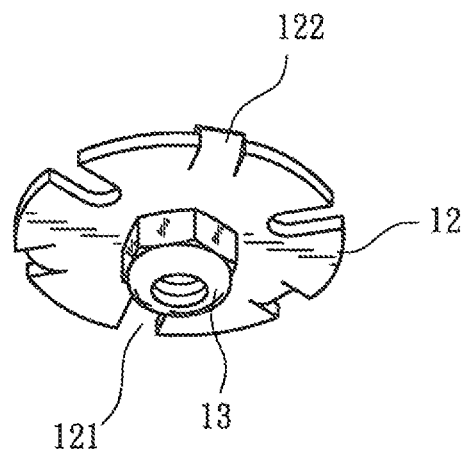
FIG. 3 is an oblique bottom elevation of the first metal plate of the fastening device in accordance with the present invention.
Figure 4:
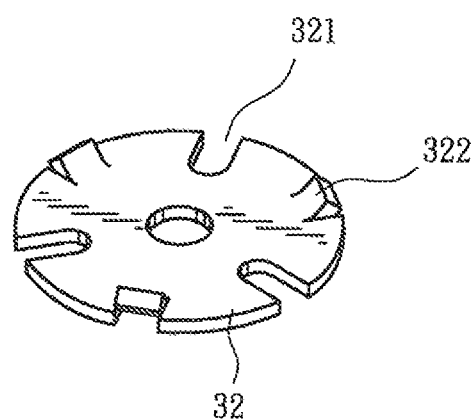
FIG. 4 is an oblique bottom elevation of the second metal plate of the fastening device in accordance with the present invention.

Referring also to FIG. 3, the resilient clamping member 10 has embedded therein a first metal plate 12 and a screw nut 13. The resilient clamping member 10 and the first metal plate 12 are fixedly mounted together by insert molding, enhancing connection strength. The screw nut 13 is bonded to one side of the first metal plate 12 by spot welding. The first metal plate 12 has a plurality of mounting holes 121 equiangularly spaced around the periphery, and a protruding portion 122 between each two adjacent mounting holes 121. Thus, during insert molding, the molten plastic material can fill up the spaces in the mounting holes 121 and the area around the protruding portions 122, enhancing the connection strength between the resilient clamping member 10 and the first metal plate 12 and prohibiting relative displacement between the resilient clamping member 10 and the first metal plate 12.

The holder cup 20 is attached to the resilient clamping member 10 and surrounded by the clamping pawls 11, comprising a plurality of longitudinal ribs 21 equiangularly spaced around the periphery thereof, a rim 22 located at the top side thereof, and a plurality of drain holes 23 located at the bottom side thereof for discharging water. The holder cup 20 and the resilient clamping member 10 are attached together and then secured to a support structure 100.

The rubber female connector 30 is accommodated in the holder cup 20, comprising a mounting hole 31, a barbed portion 311 disposed in the mounting hole 31. Further, the rubber female connector 30 has a second metal plate 32 embedded therein (see FIG. 4). The rubber female connector 30 and the second metal plate 32 are fixedly mounted together by insert molding, enhancing connection strength. Further, the structure of the second metal plate 32 is substantially similar to the first metal plate 12, having a plurality of mounting holes 321 equiangularly spaced around the periphery, and a protruding portion 322 between each two adjacent mounting holes 321. Thus, during insert molding, the molten plastic material can fill up the spaces in the mounting holes 321 and the area around the protruding portions 322, enhancing the connection strength between the rubber female connector 30 and the second metal plate 32 and prohibiting relative displacement between the rubber female connector 30 and the second metal plate 32. Further, the rubber female connector 30 has a plurality of drain holes 33 located at the bottom side thereof.

The fastening member 40 in this embodiment is a screw bolt adjustably inserted through the rubber female connector 30, the holder cup 20 and the resilient clamping member 10 and threaded into the screw nut 13. Further, the fastening member 40 has a locating groove 41 extending around the periphery near the head thereof for the mounting of a C-shaped retainer 42 so that the fastening member 40 and the C-shaped retainer 42 can secure the rubber female connector 30 and the holder cup 20 together. Subject to the screw joint between the fastening member 40 and the screw nut 13, the axial position of the resilient clamping member 10 relative to the holder cup 20 is adjustable.

Figure 5:
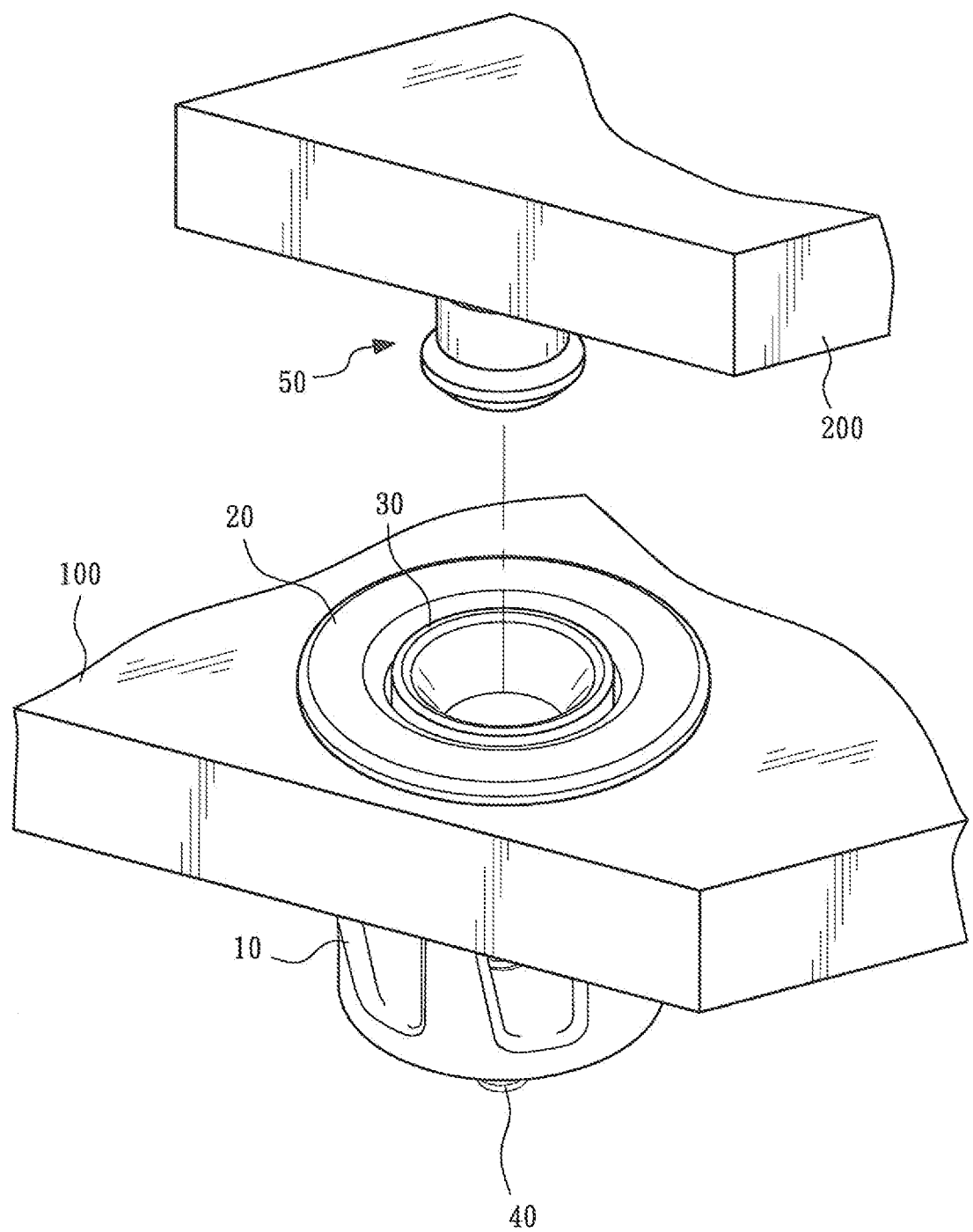
FIG. 5 is a schematic installed view of the present invention.

The male connector 50 is fastened to a decorative ornamental panel 200 by a self-tapping screw 70 and a washer 71 (see FIG. 5). The male connector 50 comprises a body 51, and a conical head 52 located at one side of the body 51. The conical head 52 has a diameter gradually reducing in direction away from the body 51 for detachably connecting to the mounting hole 31 of the rubber female connector 30. The body 51 of the male connector 50 defines wall surface 511 fitting the barbed portion 311 of the rubber female connector 30 to enhance connection stability between the male connector 50 and the rubber female connector 30.

The invention further comprises a supplementary cushion member 60. The supplementary cushion member 60 comprises a flat annular base 61, and a protruding portion 62 extended from the flat annular base 61. Thus, the supplementary cushion member 60 can be optionally set between the male connector 50 and the decorative ornamental panel 200 to control the elevation of the male connector 50 at the decorative ornamental panel 200. When the supplementary cushion member 60 is set between the male connector 50 and the decorative ornamental panel 200 and the protruding portion 62 is received in the male connector 50, the height is relatively increased. If the protruding portion 62 is abutted to the decorative ornamental panel 200 and the flat annular base 61 is abutted against the male connector 50, the height can be increased further. Thus, the invention is adjustable to fit different installation requirements.

Figure 6:
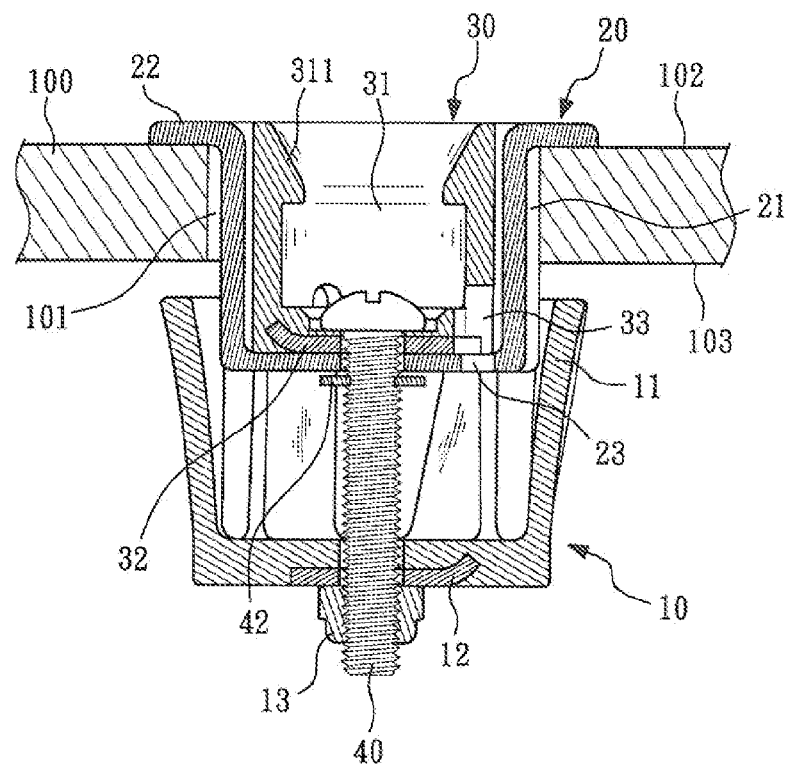
FIG. 6 is a schematic sectional view of the present invention, illustrating the assembly of the resilient clamping member, holder cup and rubber female connector of the fastening device installed in a support structure.
Figure 7:
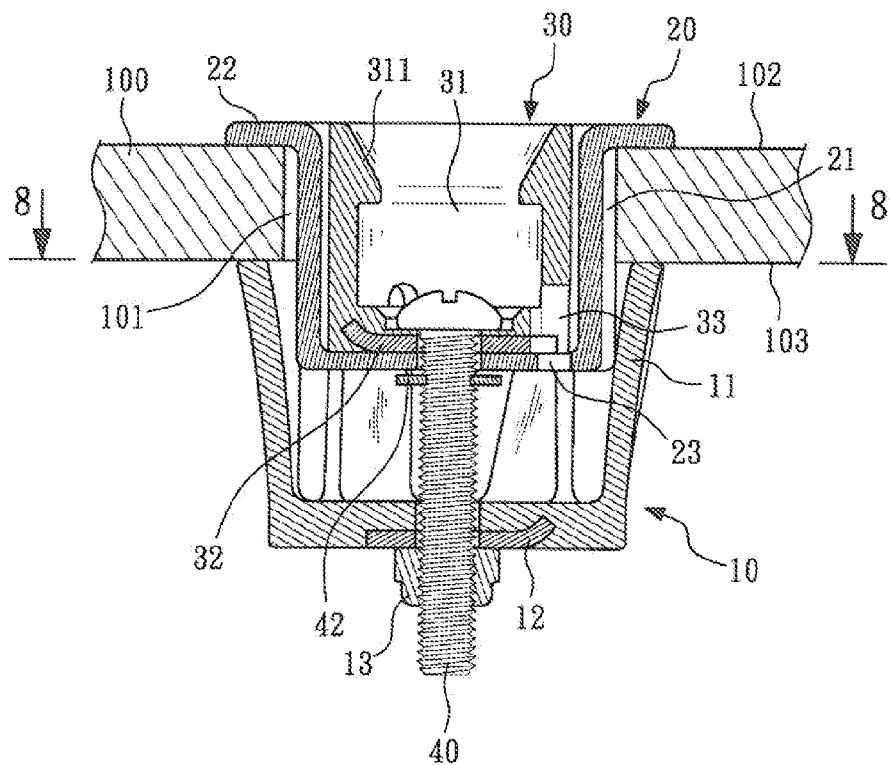
FIG. 7 corresponds to FIG. 6, illustrating the clamping pawls of the resilient clamping member stopped at the inner wall of the support structure.

Referring to FIGS. 6 and 7, during actual application, one worker can press the assembly of the resilient clamping member 10, holder cup 20 and rubber female connector 30 into a mounting hole 101 in the support structure 100. When pressing the assembly into the mounting hole 101, the clamping pawls 11 are inwardly compressed within the diameter around the longitudinal ribs 21 of the holder cup 20. After passed through the thickness of the support structure 100, the clamping pawls 11 of the resilient clamping member 10 immediately return to their former shape subject to their elastic material property, forcing the free ends 112 of the clamping pawls 11 to stop against the inner wall 103 of the support structure 100, and at the same time, the rim 22 of the holder cup 20 is stopped at the outer wall 102 of the support structure 100, and the longitudinal ribs 21 of the holder cup 20 are kept in friction engagement with the peripheral wall of the mounting hole 101, avoiding vibration. Thus, one person can achieve this installation operation conveniently and rapidly without the need of making a screw hole in the support structure 100, eliminating any trouble due non-alignment of a screw hole. Further, when fastening the fastening member 40, the clamping pawl 11 of the resilient clamping member 10 will be constrained by the longitudinal ribs 21. Thus, continuously rotating the fastening member 40 will cause the resilient clamping member 10 to move axially toward the holder cup 20, forcing the clamping pawls 11 against the inner wall 103 of the support structure 100 tightly. Therefore, the assembly of the resilient clamping member 10, holder cup 20 and rubber female connector 30 can be fastened to the support structure 100 tightly. It is to be noted that if the support structure 100 is mounted at the floor in vertical, the drain holes 23 and 33 facilitate quick discharge of water. During a cleaning work, water can be quickly carried away. Therefore, the invention facilitates routine maintenance.

Figure 8:
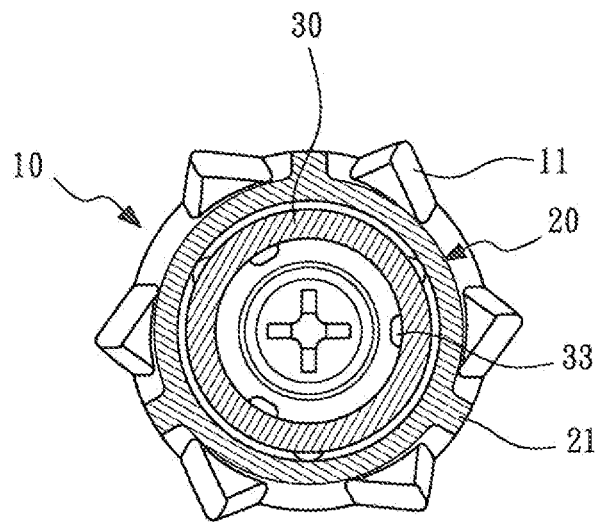
FIG. 8 is a sectional view taken along line 8-8 of FIG. 7.

FIG. 8 is a sectional view taken along line 8-8 of FIG. 7, illustrating the connection status between the resilient clamping member 10 and the holder cup 20. After installation, the maximum outer diameter of the clamping pawls 11 of the resilient clamping member 10 is larger than the outer diameter of the longitudinal ribs 21 of the holder cup 20, holding the fastening device firmly in the installed position.

Figure 9A:
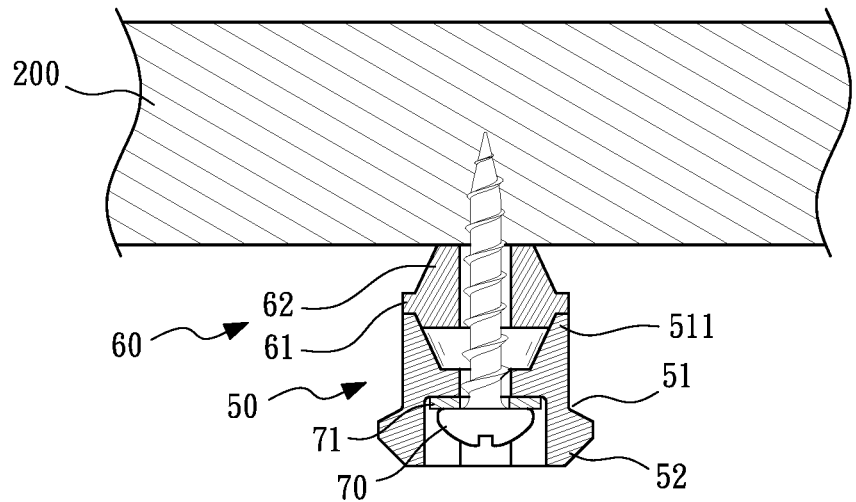
FIG. 9A is a schematic drawing of the present invention, illustrating one installation example of the male connector in the decorative ornamental panel.

FIG. 9A is a schematic drawing of the present invention, illustrating one installation example of the male connector in the decorative ornamental panel. As illustrated, the supplementary cushion member 60 is set between the male connector 50 and the decorative ornamental panel 200 and the protruding portion 62 and flat annular base 61 of the supplementary cushion member 60 are respectively abutted against the decorative ornamental panel 200 and the male connector 50, and therefore the elevation of the male connector 50 relative to the decorative ornamental panel 200 is relatively increased, facilitating adjustment of the installation elevation of the decorative ornamental panel 200.

Figure 9B:
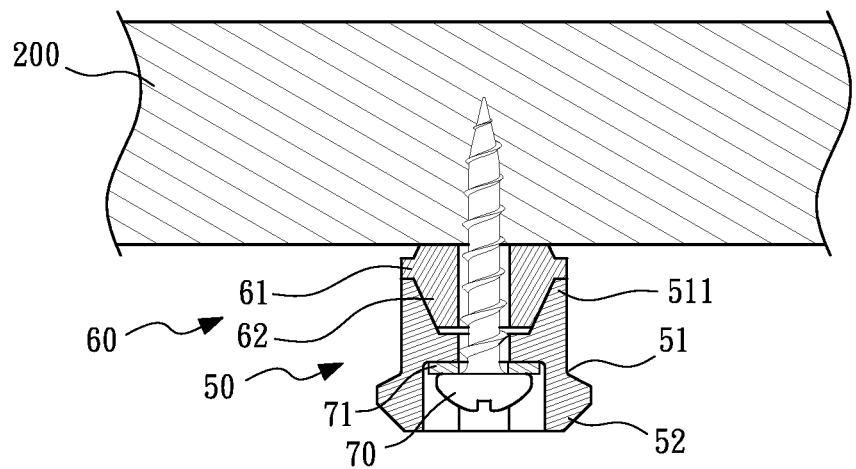
FIG. 9B is a schematic drawing of the present invention, illustrating another installation example of the male connector in the decorative ornamental panel.

FIG. 9B is a schematic drawing of the present invention, illustrating another installation example of the male connector in the decorative ornamental panel. As illustrated, the supplementary cushion member 60 is set between the male connector 50 and the decorative ornamental panel 200 and the protruding portion 62 of the supplementary cushion member 60 is received in the male connector 50. When compared to the installation example shown in FIG. 9A, the elevation of the male connector 50 relative to the decorative ornamental panel 200 is relatively lowered, fitting a different installation requirement.

Figure 9C:
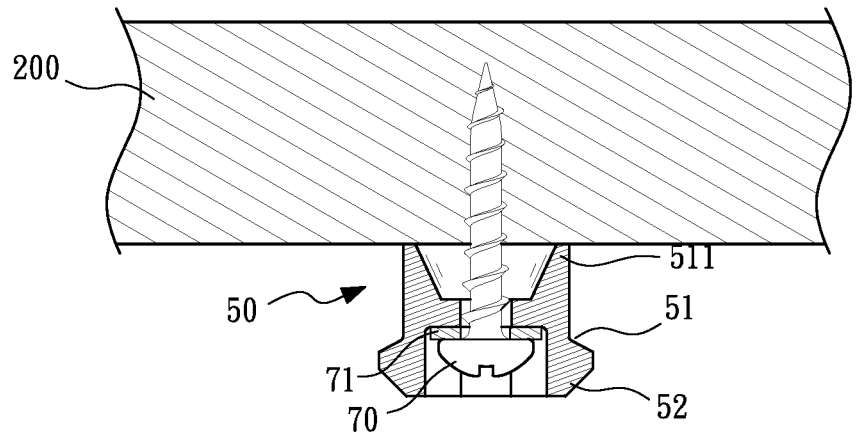
FIG. 9C is a schematic drawing of the present invention, illustrating still another installation example of the male connector in the decorative ornamental panel.

FIG. 9C is a schematic drawing of the present invention, illustrating still another installation example of the male connector in the decorative ornamental panel. As illustrated, the body 51 of the male connector 50 is abutted against the decorative ornamental panel 200 and the supplementary cushion member 60 is not used in this installation example. When compared to the installation example shown in FIG. 9A and the installation example shown in FIG. 9B, the elevation of the male connector 50 relative to the decorative ornamental panel 200 is relatively lowered, and the distance between the decorative ornamental panel 200 and the support structure can be minimized.

Figure 10:
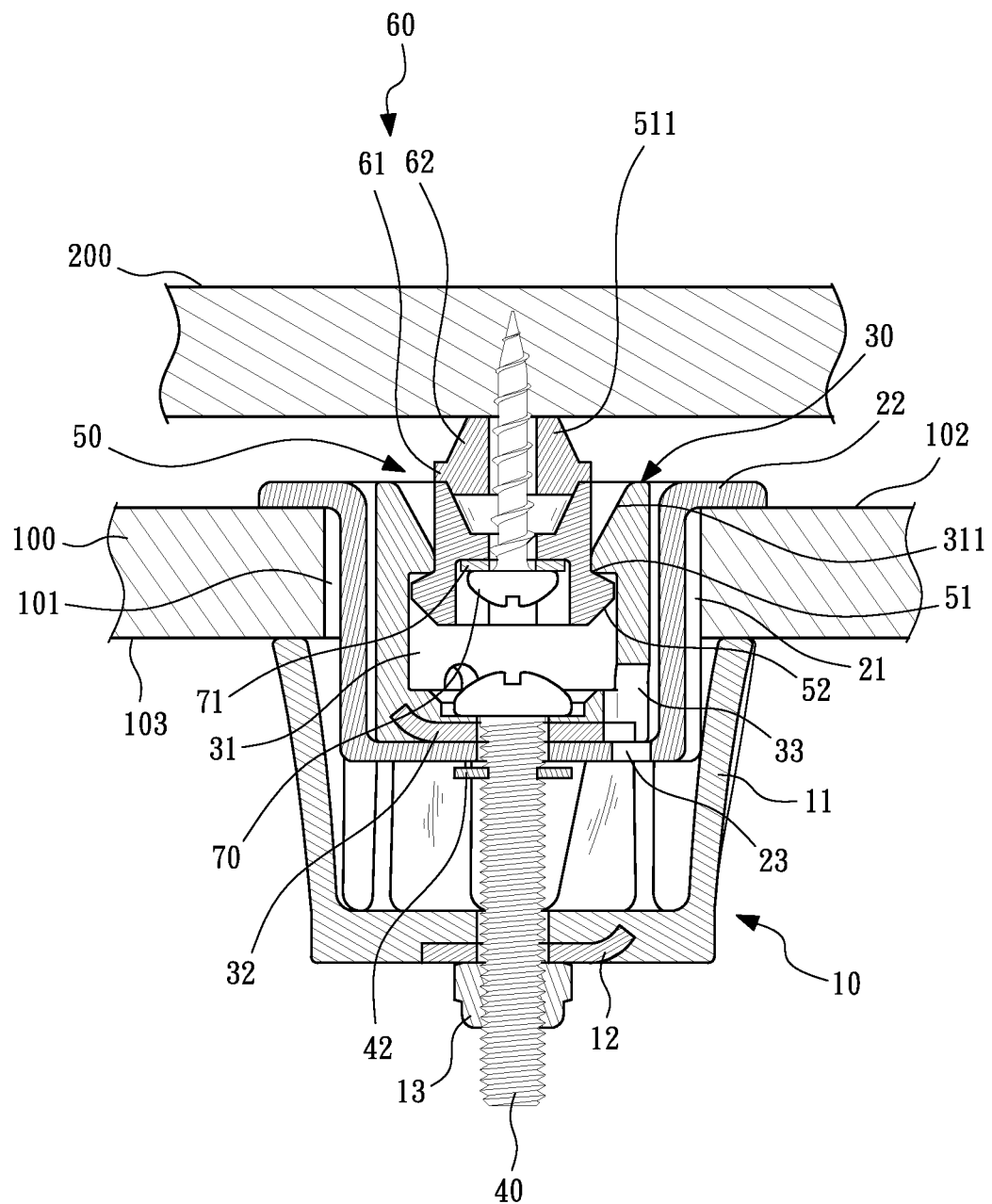
FIG. 10 is a schematic sectional view illustrating one mounting status of the present invention.

Referring to FIG. 10, a mounting status of the present invention is shown. As illustrated, the plastic male connector 50 is secured to the mounting hole 31 of the rubber female connector 30, and the material properties enhance the connection tightness between the body 51 and the barbed portion 311 against external impact or vibration. When detaching the male connector 50, the rubber female connector 30 will not be carried out of place by the male connector 50. Further, this design avoids friction damage between the rubber female connector 30 and the male connector 50, allowing repeat use of the product and facilitating replacement of decorative ornamental panels of different designs or different materials to fit different installation and decoration requirements.

Figure 11:
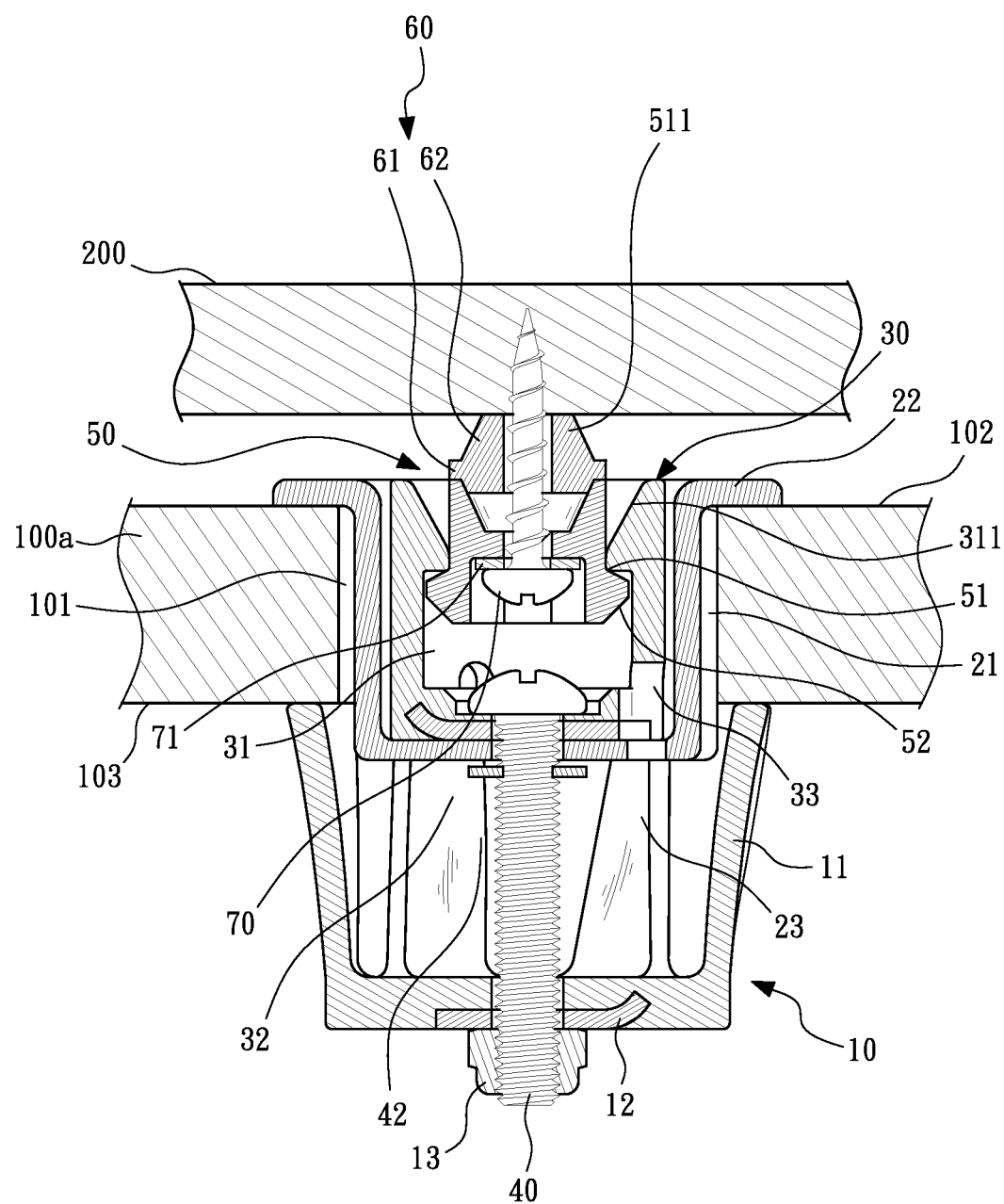
FIG. 11 is a schematic sectional view illustrating another mounting status of the present invention.

Referring to FIG. 11, another mounting status of the present invention is shown. As illustrated, the resilient clamping member 10 and the holder cup 20 are fastened together by the fastening member 30. This mounting arrangement enables the resilient clamping member 10 and the holder cup 20 to be adjustably installed in a thick support structure 100a.

Figure 12:
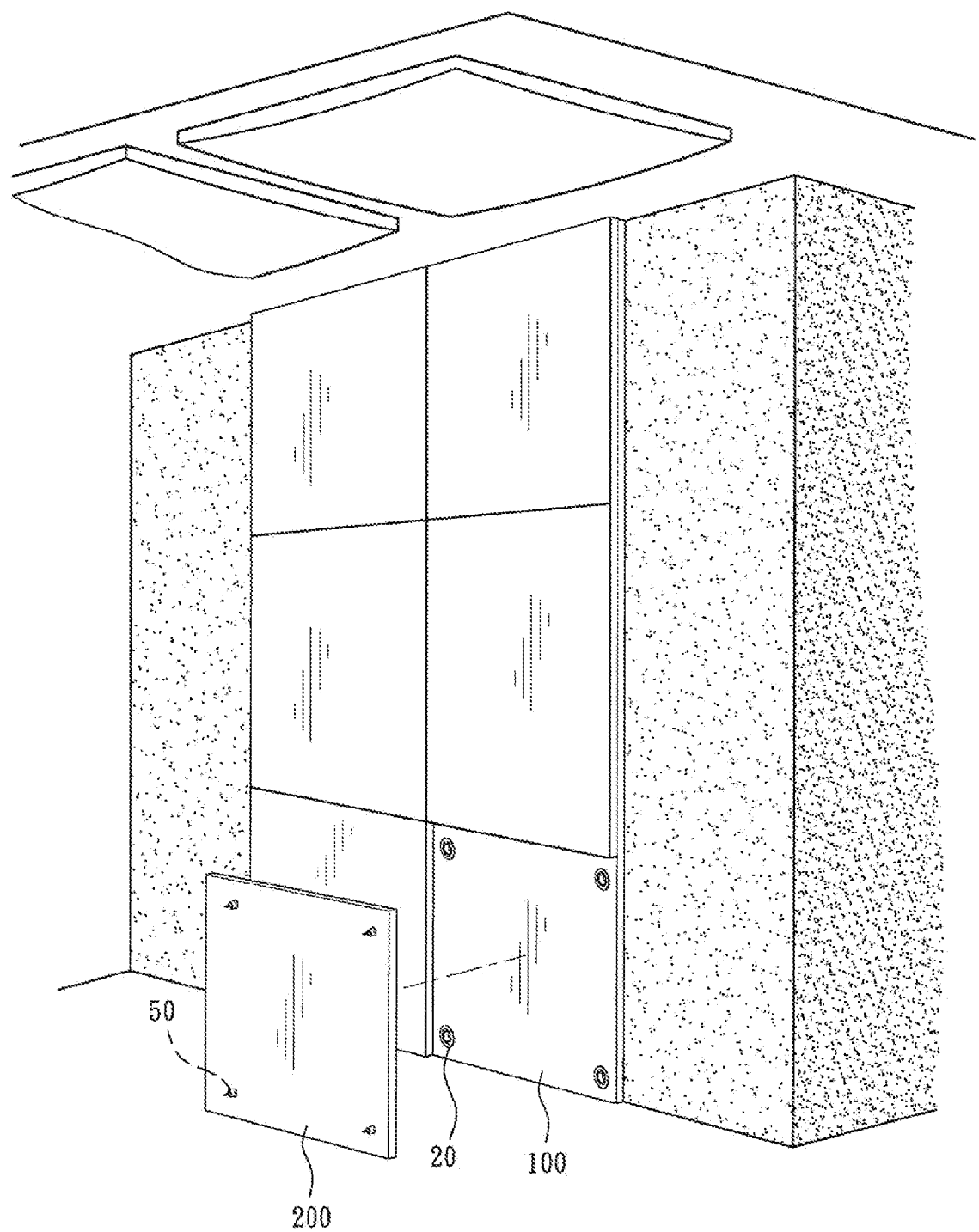
FIG. 12 illustrates one application example of the present invention.

Referring to FIG. 12, one application example of the present invention is shown. As illustrated, the decorative ornamental panel 200 can be adapted for upholstery application. Subject to the application of the fastening device of the present invention, multiple decorative ornamental panels can be conveniently mounted in a support structure 100, for example, a wall in a house, and kept abutted against one another.

Figure 13:
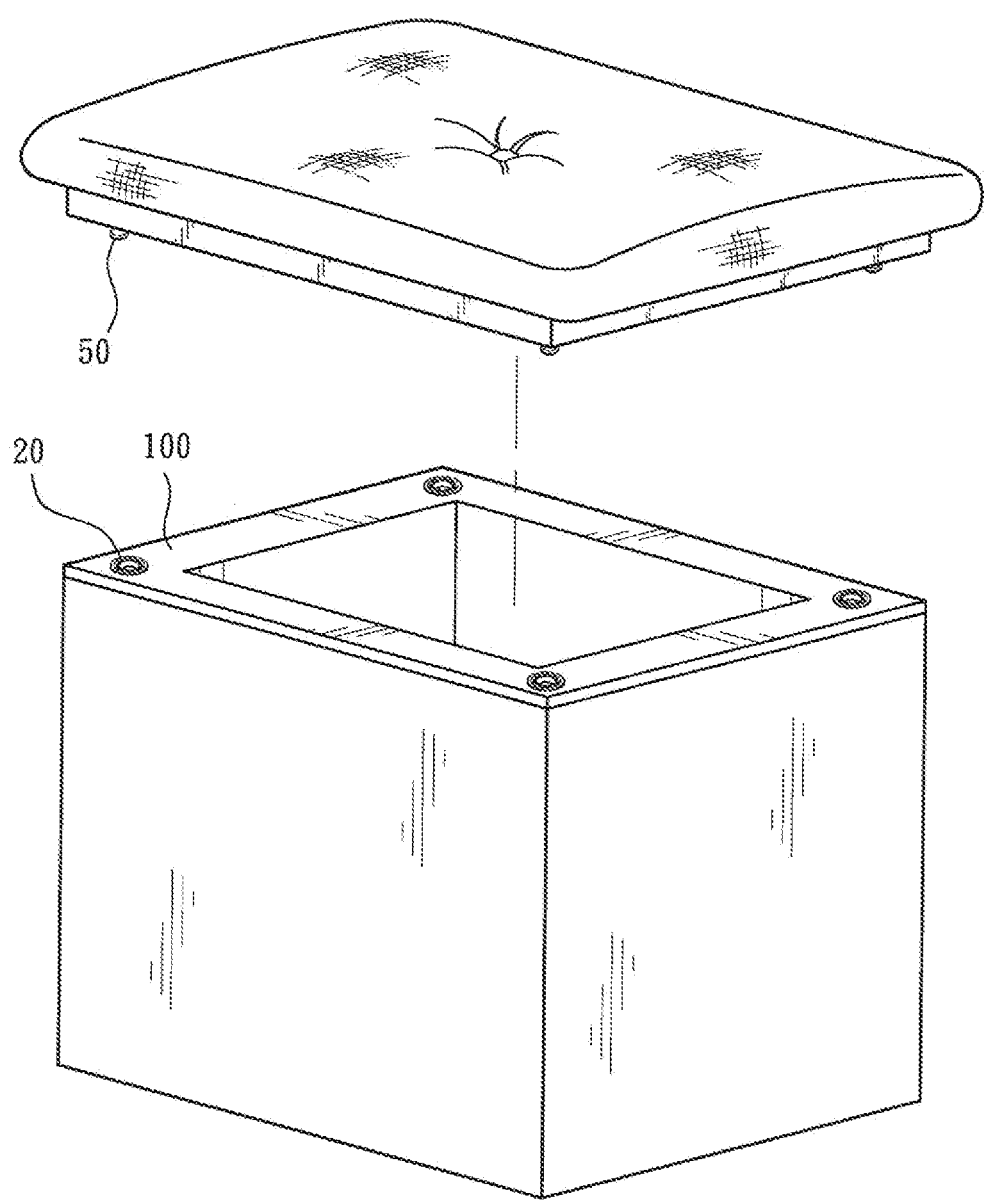
FIG. 13 illustrates another application example of the present invention.

Referring to FIG. 13, another application example of the present invention is shown. As illustrated, the decorative ornamental panel 200 can be a seat cushion. Subject to the application of the fastening device of the present invention, the decorative ornamental panel (seat cushion) 200 can be conveniently fastened to a support structure 100 that is made in the form of a seat body.

Figure 14:
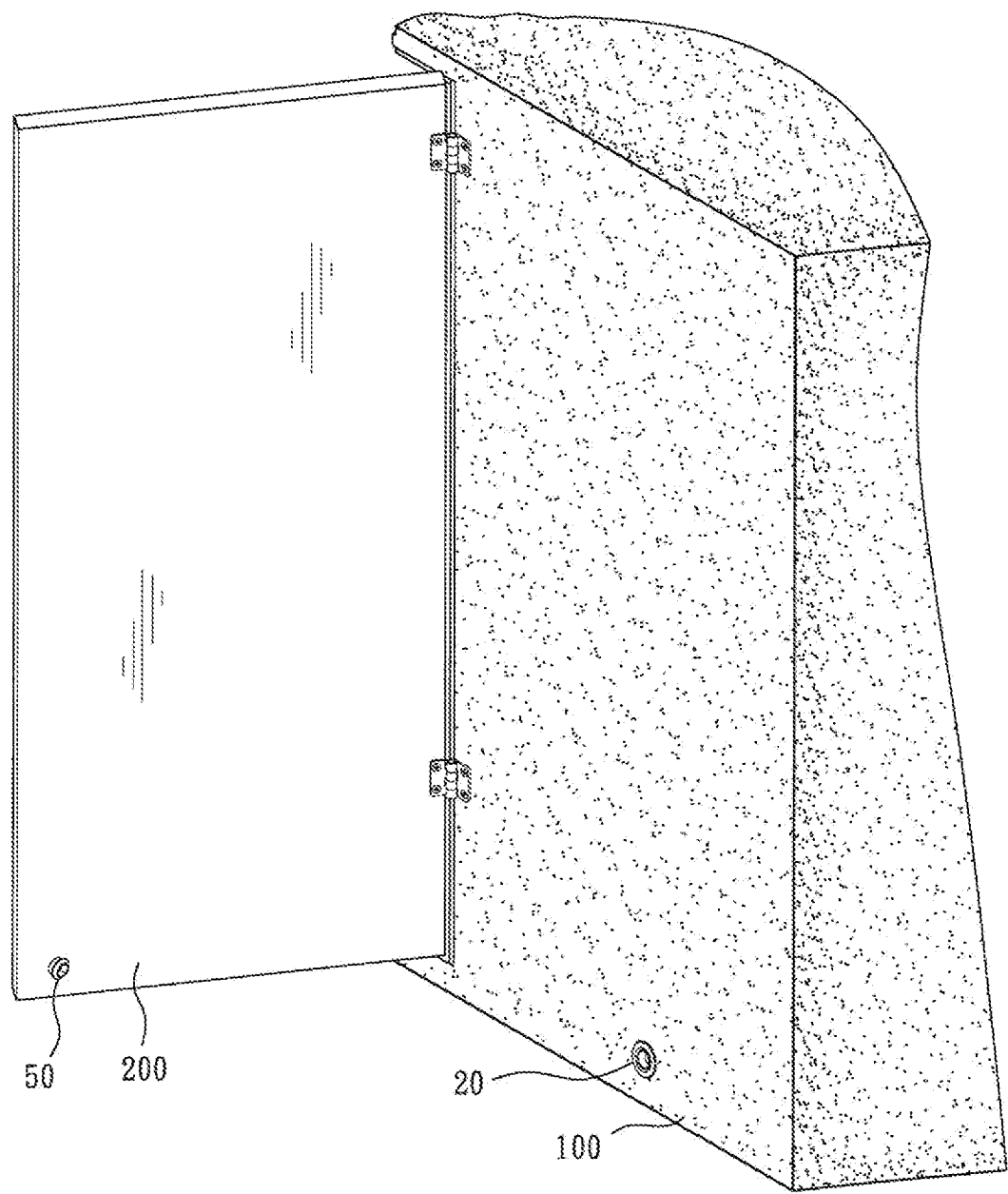
FIG. 14 illustrates still another application example of the present invention.

Referring to FIG. 14, according to another application example of the present invention, the decorative ornamental panel 200 is a door panel, and the support structure 100 is a support wall, and the fastening device of the present invention is used as a door catch.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A fastening device for removably combining a decorative ornamental panel to a support structure having a mounting hole, comprising:
    a resilient clamping member, having a plurality of equiangularly spaced clamping pawls adapted for stopping against an inner wall of said support structure, each said clamping pawl defining a fixed end and a free end, a cross sectional area of said free end being smaller than a cross-sectional area of said fixed end, said free end being gradually outwardly deflected in direction away from said fixed end;
    a holder cup detachably attached to said resilient clamping member and mountable with said resilient clamping member in said mounting hole of said support structure for enabling said holder cup and said resilient clamping member to be respectively stopped at opposing inner wall and outer wall of said support structure;
    a rubber female connector accommodated in said holder cup, said rubber female connector defining therein a mounting hole;
    a fastening member adjustably inserted through said rubber female connector, said holder cup and said resilient clamping member and adapted to adjust the axial position of said resilient clamping member relative to said holder cup; and
    a male connector fastened to said decorative ornamental panel, said male connector comprising a body detachably mounted in the mounting hole of said rubber female connector to secure said decorative ornamental panel to said support structure.

2. The fastening device as claimed in claim 1, wherein said resilient clamping member is a plastic member having a first metal plate embedded in a bottom side thereof and a screw nut bonded to said first metal plate; said fastening member is a screw bolt for threading into said screw nut, comprising a locating groove extending around the periphery thereof and a C-shaped retainer fastened to said locating groove to secure said rubber female connector and said holder cup together, said first metal plate comprising a plurality of equiangularly spaced mounting holes and a protruding portion between each two adjacent mounting holes of said first metal plate.

3. The fastening device as claimed in claim 1, wherein said holder cup comprises a plurality of longitudinal ribs spaced around the periphery thereof and adapted to constrain said clamping pawls and to further prohibit rotation of said resilient clamping member relative to said holder cup.

4. The fastening device as claimed in claim 1, wherein said holder cup comprises a rim for stopping against the outer wall of said support structure.

5. The fastening device as claimed in claim 1, wherein said holder cup comprises a plurality of drain holes at a bottom side thereof.

6. The fastening device as claimed in claim 1, wherein said rubber female connector has a second metal plate embedded therein and configured for the passing of said fastening member for the resting of a head of said fastening member, said second metal plate comprising a plurality of equiangularly spaced mounting holes and a protruding portion between each two adjacent mounting holes of said second metal plate.

7. The fastening device as claimed in claim 1, wherein said rubber female connector comprises a plurality of drain holes at a bottom side thereof.

8. The fastening device as claimed in claim 1, wherein said rubber female connector further comprises a barbed portion located in the mounting hole thereof; said body of said male connector matches said barbed portion.

9. The fastening device as claimed in claim 8, wherein said male connector further comprises a conical head, said conical head having a diameter gradually reducing in direction away from said body.

10. The fastening device as claimed in claim 8, wherein said body of said male connector comprises a wall surface matching said barbed portion.

11. The fastening device as claimed in claim 1, further comprising a supplementary cushion member selectively connected to said male connector to change the elevation of said male connector at said decorative ornamental panel, said supplementary cushion member comprising a flat annular base and a protruding portion extended from said flat annular base; said male connector is configured for receiving the protruding portion of said supplementary cushion member.

* * * * *